(12) United States Patent
Jajtic et al.

(10) Patent No.: US 9,543,064 B2
(45) Date of Patent: Jan. 10, 2017

(54) ELECTRIC MACHINE HAVING A LOW-MASS DESIGN IN MAGNETICALLY ACTIVE PARTS

(75) Inventors: Zeljko Jajtic, München (DE); Gerhard Matscheko, Starnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 271 days.

(21) Appl. No.: 14/234,889

(22) PCT Filed: Jul. 20, 2012

(86) PCT No.: PCT/EP2012/064338
§ 371 (c)(1),
(2), (4) Date: Jan. 24, 2014

(87) PCT Pub. No.: WO2013/014103
PCT Pub. Date: Jan. 31, 2013

(65) Prior Publication Data
US 2014/0167894 A1    Jun. 19, 2014

(30) Foreign Application Priority Data
Jul. 26, 2011   (DE) .................. 10 2011 079 843

(51) Int. Cl.
*H02K 41/02*   (2006.01)
*H01F 3/10*   (2006.01)
(Continued)

(52) U.S. Cl.
CPC ............... *H01F 3/10* (2013.01); *H01F 41/02* (2013.01); *H02K 1/02* (2013.01); *H02K 1/06* (2013.01);
(Continued)

(58) Field of Classification Search
CPC ............ H02K 1/02; H02K 1/06; H02K 1/146; H02K 7/1838; H02K 2213/03; H02K 41/02; H01F 3/10; H01F 41/02; Y02E 10/725; Y10T 29/4902
See application file for complete search history.

(56) References Cited

U.S. PATENT DOCUMENTS 5,420,471 A * 5/1995 Yun .................. H02K 19/16
310/191
5,864,196 A   1/1999 Yun
(Continued)

FOREIGN PATENT DOCUMENTS

| CN | 201650604 U | 11/2010 |
|----|-------------|---------|
| DE | 279591 A    | 8/1913  |

(Continued)

OTHER PUBLICATIONS

R. Brand, L. Baselgia Stahel, A. Vezzini: Tuning für Electromotoren—Optimierung eines Hochieistungs-Permanentmagnetmotors durch Verwendung von Kobalt-Eisen-Blechpaketen; in: Antriebstechnik May 2011, pp. 68-70.; 2011.

*Primary Examiner* — Joshua Benitez-Rosario
*Assistant Examiner* — Leda Pham
(74) *Attorney, Agent, or Firm* — Henry M. Feiereisen LLC

(57) ABSTRACT

An electric machine includes a first magnetic pole with an arrangement of interposed magnetically active layers and magnetically inactive layers, and a second magnetic pole movable relative to the first magnetic pole and spaced from the first magnetic pole by a gap. An electrical conductor operates as a coupling element between an electrical circuit and a magnetic circuit. At an operating time, a common useful magnetic flux for electromechanical energy conversion flows through the magnetic circuit composed of the first magnetic pole, the gap and the second magnetic pole. The (Continued)

magnetically inactive layers have a lower average density than the magnetically active layers. A ratio (k) of the total volume of the magnetically active layers to the combined total volume of the magnetically active and inactive layers fulfills the condition $0.5 \leq k \leq 0.8$ A method for producing an electric machine are also disclosed.

17 Claims, 7 Drawing Sheets

(51) Int. Cl.
　　　H02K 1/02　　　(2006.01)
　　　H02K 1/06　　　(2006.01)
　　　H02K 1/14　　　(2006.01)
　　　H01F 41/02　　　(2006.01)
　　　H02K 7/18　　　(2006.01)
(52) U.S. Cl.
　　　CPC ............ *H02K 1/146* (2013.01); *H02K 7/1838* (2013.01); *H02K 2213/03* (2013.01); *Y02E 10/725* (2013.01); *Y10T 29/4902* (2015.01)

(56) References Cited

U.S. PATENT DOCUMENTS

| | | | |
|---|---|---|---|
| 7,057,312 | B2 | 6/2006 | Matscheko et al. |
| 7,271,509 | B2 | 9/2007 | Jajtic et al. |
| 7,332,839 | B2 | 2/2008 | Jajtic et al. |
| 7,638,916 | B2 | 12/2009 | Jajtic et al. |
| 7,679,226 | B2 | 3/2010 | Jajtic et al. |
| 7,746,064 | B2 | 6/2010 | Knorr et al. |
| 7,800,256 | B2 | 9/2010 | Jajtic et al. |
| 7,834,489 | B2 | 11/2010 | Matscheko et al. |
| 7,859,142 | B2 | 12/2010 | Jajtic et al. |
| 7,859,143 | B2 | 12/2010 | Jajtic et al. |
| 7,863,782 | B2 | 1/2011 | Matscheko et al. |
| 7,893,569 | B2 | 2/2011 | Jajtic et al. |
| 7,915,769 | B2 | 3/2011 | Jajtic |
| 7,928,613 | B2 | 4/2011 | Jajtic et al. |
| 7,948,123 | B2 | 5/2011 | Jajtic |
| 7,952,237 | B2 | 5/2011 | Matscheko et al. |
| 7,969,144 | B2 | 6/2011 | Jajtic et al. |
| 8,062,200 | B2 | 11/2011 | Jajtic et al. |
| 8,076,804 | B2 | 12/2011 | Jajtic et al. |
| 8,102,085 | B2 | 1/2012 | Jajtic |
| 8,274,195 | B2 | 9/2012 | Jajtic et al. |
| 2001/0030486 | A1 | 10/2001 | Pijanowski |
| 2004/0245860 | A1 | 12/2004 | Hodzic et al. |
| 2005/0001493 | A1 | 1/2005 | Jajtic et al. |
| 2005/0006959 | A1 | 1/2005 | Jajtic et al. |
| 2005/0067915 | A1 | 3/2005 | Ryuichiro |
| 2005/0248218 | A1 | 11/2005 | Schmid |
| 2006/0108878 | A1* | 5/2006 | Lindberg ............... H02K 1/02 310/12.22 |
| 2007/0222304 | A1 | 9/2007 | Jajtic et al. |
| 2007/0236090 | A1 | 10/2007 | Jajtic et al. |
| 2007/0278865 | A1 | 12/2007 | Matscheko et al. |
| 2008/0066548 | A1 | 3/2008 | Jajtic et al. |
| 2008/0164830 | A1 | 7/2008 | Jajtic et al. |
| 2008/0185932 | A1 | 8/2008 | Jajtic et al. |
| 2008/0190732 | A1 | 8/2008 | Matscheko et al. |
| 2008/0246466 | A1 | 10/2008 | Jajtic et al. |
| 2008/0265689 | A1 | 10/2008 | Jajtic et al. |
| 2009/0039717 | A1 | 2/2009 | Jajtic et al. |
| 2009/0140583 | A1 | 6/2009 | Jajtic et al. |
| 2009/0174266 | A1 | 7/2009 | Jajtic et al. |
| 2009/0179505 | A1 | 7/2009 | Jajtic et al. |
| 2009/0189465 | A1 | 7/2009 | Matscheko et al. |
| 2009/0206681 | A1 | 8/2009 | Jajtic et al. |
| 2009/0206682 | A1 | 8/2009 | Jajtic |
| 2009/0206684 | A1 | 8/2009 | Jajtic et al. |
| 2009/0256428 | A1 | 10/2009 | Jajtic et al. |
| 2009/0258770 | A1 | 10/2009 | Jajtic et al. |
| 2009/0284104 | A1 | 11/2009 | Knorr et al. |
| 2009/0322162 | A1 | 12/2009 | Jajtic et al. |
| 2010/0026104 | A1 | 2/2010 | Jajtic et al. |
| 2010/0040448 | A1 | 2/2010 | Knorr et al. |
| 2010/0083851 | A1 | 4/2010 | Matscheko et al. |
| 2010/0219702 | A1 | 9/2010 | Jajtic et al. |
| 2010/0231059 | A1 | 9/2010 | Matscheko et al. |
| 2010/0301684 | A1 | 12/2010 | Matscheko et al. |
| 2011/0133587 | A1 | 6/2011 | Jajtic et al. |
| 2011/0140552 | A1 | 6/2011 | Zhiqiang |
| 2011/0254386 | A1* | 10/2011 | Liu ..................... H02K 7/1869 310/12.25 |
| 2012/0193172 | A1 | 8/2012 | Matscheko et al. |
| 2014/0062247 | A1 | 3/2014 | Dorfner et al. |

FOREIGN PATENT DOCUMENTS

| | | |
|---|---|---|
| DE | 102004021973 A1 | 12/2005 |
| EP | 0237848 A2 | 9/1987 |
| EP | 0291638 A2 | 11/1988 |
| EP | 2093867 A1 | 8/2009 |
| EP | 2375545 A1 | 10/2011 |
| GB | 300911 A | 1/1930 |
| GB | 2132418 A | 7/1984 |
| GB | 2271219 A | 4/1994 |
| GB | 2403073 A | 12/2004 |
| JP | 58116032 A | 7/1983 |
| JP | 60213234 A | 10/1985 |
| JP | S63121466 A | 5/1988 |
| JP | 5068352 A | 3/1993 |
| JP | 07-075274 A2 | 3/1995 |
| JP | 2000041353 A2 | 2/2000 |
| JP | 2006222244 A2 | 8/2006 |
| JP | 2008022593 A | 1/2008 |
| RU | 2037070 C1 | 6/1995 |
| RU | 2406210 C1 | 12/2010 |

* cited by examiner

ELECTRIC MACHINE HAVING A
LOW-MASS DESIGN IN MAGNETICALLY
ACTIVE PARTS

CROSS-REFERENCES TO RELATED
APPLICATIONS

This application is the U.S. National Stage of International Application No. PCT/EP2012/064338, filed Jul. 20, 2012, which designated the United States and has been published as International Publication No. WO 2013/014103 and which claims the priority of German Patent Application, Serial No. 10 2011 079 843.9, filed Jul. 26, 2011, pursuant to 35 U.S.C. 119(a)-(d).

BACKGROUND OF THE INVENTION

The invention relates to an electric machine which includes a first magnetic pole having an arrangement of layers with magnetically active layers and a second magnetic pole moveable relative to the first magnetic pole and spaced from the first magnetic pole by a pap, and an electric conductor as a coupling element between an electric circuit and a magnetic circuit, wherein for electromechanical energy conversion the magnetic circuit includes the first magnetic pole, the pap and a second magnetic pole. The invention also relates to a magnetic pole part with the aforedescribed first magnetic pole with the arrangement of layers, a vehicle and a wind turbine as well as a method for producing an electric machine of this type.

Electric machines of the aforementioned type can be used as a drive motor or as a generator. One reason for the increased use of electric machines as a drive motor is that because of the scarcity of fossil fuels an alternative must be found to conventional internal combustion engines. Reliance is in this case being placed on renewable energy sources as a replacement for fossil fuels. Because a renewable energy source is not always available at the right time and place, the renewable energy has to be converted into a form of energy that can be transported and stored. Electrical energy has become established as the form of energy here. Electrical energy can be obtained from renewable energy sources using electric machines which act as generators, transported by cables, temporarily stored in batteries and converted into motive energy by high-efficiency motors. The generators are in this case fixed in supporting structures which must withstand the natural forces of the renewable energy sources. It must be possible for the motors to be used efficiently, as well as effectively, in mobile applications. When using an electric machine as a generator or motor as high a power density as possible is desirable, because the power that can be supplied needs to be as high as possible in proportion to the mass of the electric motor, given that the smaller the mass of the generator, the more cheaply the mounting structure can be produced. In the case of the motor in the mobile application, for instance in a vehicle, the smaller mass moved means energy can be saved and thus the vehicle operated more cheaply.

In the past a reduction in the mass achieved for this purpose in the magnetically active part of the electric machine by optimizing the lamination geometry and selecting suitable materials for the metal sheets was often insufficient.

Thus on pages 68-70 of the magazine "antriebstechnik 5/2011" the authors Brand, Stahel and Vezzini describe a high-performance permanent magnet motor in which metal sheets made of cobalt-iron materials are used in the stator and rotor. The article primarily describes the need for a higher torque, which is achieved using metal sheets made of a cobalt-iron alloy with a saturation polarization of 2.35 Tesla compared to a silicon-iron material with a saturation polarization of 2.03 Tesla. It was possible to increase the maximum torque by 22% in this case. The last paragraph of the article states that instead of increasing the maximum torque, the volume and thus the weight of the motor can be reduced with the same maximum torque.

Although the article cited describes how cobalt-iron alloys have been the norm for decades in the aviation industry for reasons of weight reduction, nevertheless the weight reduction achieved by the use of cobalt-iron alloys is still not sufficient for many applications.

SUMMARY OF THE INVENTION

The object of the invention is therefore to improve the electric machine such that a further reduction in the mass of the magnetically active parts is achieved with the same performance of the electric machine.

The inventive electric machine comprises
a first magnetic pole, which has an arrangement of layers which comprises magnetically active layers with a total volume $V_a$,
a second magnetic pole, wherein the first magnetic pole and the second magnetic pole can be moved relative to one another, and
a gap which has a length $l_S$ in a direction parallel to one of the layers from an end of the first magnetic pole bounding the gap to an end of the second magnetic pole bounding the gap,
an electrical conductor as a coupling element between an electrical circuit and a magnetic circuit,
wherein at an operating time the magnetic circuit comprises the first magnetic pole, the gap with length $l_S$ and the second magnetic pole, through all of which a common useful magnetic flux flows for electromechanical energy conversion, wherein the arrangement comprises magnetically inactive layers with a total volume $V_i$ which have a lower average density than the magnetically active layers, and a sequence in the arrangement of the magnetically inactive layers and the magnetically active layers is essentially specified by a repetition of a period p which has a defined order of magnetically active layers and magnetically inactive layers, wherein a spatial component k which is defined by the equation $$k = V_a/(V_a + V_i)$$

fulfills the condition $$0.5 \leq k \leq 0.8$$

The electric machine comprises the first magnetic pole. A magnetic pole, in particular the first magnetic pole or the second magnetic pole, is a location in the vicinity of which the magnetic field strength is particularly high. This is achieved in that the magnetic pole comprises a permanent magnet or a material which is more mechanically conductive than the area surrounding the magnetic pole. The first magnetic pole or also the second magnetic pole therefore preferably comprises ferromagnetic materials such as for example iron, cobalt, nickel or ferrites, in order to concentrate the magnetic field in the magnetic pole. The relative permeability of ferromagnetic substances is significantly greater than 1. The ferrites have e.g. a relative permeability of 4. The reason for the preferred use of iron is that iron has a relative permeability of over 300. Use is generally made of iron materials or iron alloys with special properties, for example iron-silicon alloys or iron-cobalt alloys, for magnetic poles. Magnetic poles can additionally be generated with the aid of powered coils.

The first magnetic pole comprises the arrangement of layers which comprise magnetically active layers. "Magnetically active layer" means a layer which comprises ferromagnetic materials. An arrangement in layers is advantageous in order to prevent eddy-current losses in the case of a rapidly changing magnetic flux in the first magnetic pole or also in the second magnetic pole.

So that electromechanical energy conversion can be effected by an electric machine, the electric machine comprises at least the first and the second magnetic pole which can be moved relative to one another and are spaced apart by the gap.

Furthermore it is necessary for at least one electrical conductor to be present as a coupling element between the electrical circuit and the magnetic circuit.

In particular the electrical conductor comprises several turns, so that a higher coupling exists between the electrical circuit and the magnetic circuit. At an operating time the magnetic circuit comprises the first magnetic pole, the gap with a length $l_S$ and the second magnetic pole, through all of which a common useful magnetic flux flows for electromechanical energy conversion.

The electrical conductor for example surrounds the first magnetic pole or the second magnetic pole, in particular in the form of turns. The turns are part of a winding.

The electric machine preferably comprises further magnetic poles. Thus the windings can be led around further magnetic poles. The windings can be embodied as distributed windings or as concentrated windings. One of the advantages of concentrated windings is that they take up less space than distributed windings.

The first magnetic pole or the second magnetic pole is in particular arranged in relation to the further magnetic poles such that the magnetically active layers of the first magnetic pole or of the second magnetic pole lie in a plane with magnetically active layers of the further poles.

If the first magnetic pole is embodied as a tooth, a concentrated winding can be embodied as a tooth-wound coil. An advantage of using tooth-wound coils is that a yoke, which connects the first magnetic pole to further magnetic poles which are embodied as teeth, is embodied to be thinner than the tooth of the first magnetic pole or of the further magnetic poles. Thus less magnetically active material is required.

In the case of a distributed winding a pole has at least two teeth which are surrounded by the winding.

This also applies analogously for the second magnetic pole, if it is connected to further magnetic poles.

If the first or the second magnetic pole is connected to further teeth, the electrical conductors of two different tooth-wound coils (double-layer winding) or of just one tooth-wound coil (single-layer winding) can be arranged in an interspace between two teeth.

The first magnetic pole can be part of a stator and the second magnetic pole part of a rotor. The first magnetic pole and the second magnetic pole are spaced apart from one another by the gap of length $l_S$; the length $l_S$ is in this case measured in a direction parallel to one of the layers from an end of the first magnetic pole bounding the gap to an end of the second magnetic pole bounding the gap. In particular, the end of the first magnetic pole bounding the gap is a first boundary area bounding the first magnetic pole and the end of the second magnetic pole bounding the gap is a second boundary area bounding the second magnetic pole. The length of the gap $l_S$ is then the distance from the first boundary area to the second boundary area. The first magnetic pole and the second magnetic pole are mounted relative to one another such that, when the electric machine is configured as a linear machine, they can be displaced spaced apart relative to one another by the gap of length $l_S$ in a plane or in a straight line and can thus be moved. If the electric machine is configured as a rotary electric machine the rotor is in most cases mounted so as to rotate concentrically about the stator. The stator can here comprise the first magnetic pole and the rotor the second magnetic pole. It is also possible for the rotor to comprise the first magnetic pole and the stator the second magnetic pole. If the stator or the rotor is constructed such that it has mechanically distinct poles, the gap of length $l_S$ can then be measured if the first and the second magnetic pole are positioned relative to one another such that a common useful magnetic flux can flow through them at the operating time.

The inventive electric machine deviates from the teaching that the spatial component k is chosen to be as large as possible (0.95 . . . 0.98) and the saturation polarization is made as high as possible by selecting corresponding materials. The attempt is thus made to build the electric machine to be as compact as possible in order to achieve a weight reduction with the same performance, in particular the same power yield. In the case of the inventive electric machine it was however recognized that a significantly less compact structure in respect of the spacing of the magnetically active layers only leads to a small reduction in performance, whereas a major reduction in the mass of the magnetically active part of the electric machine can be achieved. Surprisingly, the magnetically active layers and magnetically inactive layers arranged essentially by a repetition of the period p in their sequence, in conjunction with the condition for the spatial component k, enable a useful magnetic flux to be achieved which is virtually as large as with a compact design of the magnetically active parts of an electric machine. This essentially means that when there are local deviations in the sequence of the arrangement of the layers a small reduction in performance occurs. Deviations in the sequence of the layers which affect up to ±20% of the layers are local deviations.

By selecting a first material for the magnetically active layers and a second material for the magnetically inactive layers which has a lower average density than the first material, a reduction in mass is achieved. According to the invention the reduction in mass is possible because the magnetically inactive layers made of the second material represent a significant proportion of the volume of the magnetically active parts of the electric machine. Because the magnetically inactive layers or magnetically active layers can also be structured non-homogeneously, the average densities of the volumes $V_a$ and $V_i$ are taken into consideration.

Thus in particular a configuration of the invention is advantageous, in which the magnetically active layers have thicknesses $b_{Ai}$ which essentially all fulfill the condition $$b_{Ai} \leq l_S/4 \ldots l_S/10.$$

In this condition it is assumed that the length $l_S$, if it is measured at different magnetically active layers parallel thereto, only has small deviations, so that for the length $l_S$ the average length $l_S$ of the values of the length $l_S$ measured parallel to the magnetically active layers can be used for this condition. In electric machines with movable magnetic poles the person skilled in the art generally strives to embody the length of the gap between movable magnetic poles with as constant a length as possible, in order to achieve an optimum operating mode.

If the thicknesses $b_{Ai}$ of the magnetically active layers fulfill the aforementioned condition, a significant reduction is achieved in the mass of the electric machine compared to a compact design of the magnetically active parts of the electric machine with only a small reduction in performance, and in particular, by suitably selecting a particular part-value of the length $l_S$, e.g. a fraction from ¼ to ½0 of the length $l_S$, in the condition for the thicknesses $b_{Ai}$, the reduction in mass or the resulting reduction in performance for a machine type of the electric machine or of the application can be improved.

The thicknesses $b_{Ai}$ of the magnetically active layers can differ from one another for example by up to ±20%, without this resulting in a significant impact on the effect of the invention.

This is also the case for the magnetically inactive layers.

In a further advantageous configuration of the invention a permanent magnet is arranged in the gap at the end of the second magnetic pole bounding the gap, and comprises a first and a second permanent-magnet pole, its first permanent-magnet pole facing the bounding end of the second magnetic pole. The second permanent-magnet pole of the permanent magnet thus at the operating time faces the end of the first magnetic pole bounding the gap. The permanent magnet is advantageously fixed to the second magnetic pole. This is embodied as force-fit or form-fit connections or a combination of both types of connection. A space-saving connection entails fixing the permanent magnet to the surface of the second magnetic pole which bounds the gap.

An additional effect of the configuration with the permanent magnet, besides the advantageous effects of the use of permanent magnets in electromechanical energy converters, is that the gap between the first and the second magnetic pole can be selected to be effectively larger. Because the permanent magnet behaves virtually like the medium of air as regards its relative permeability, the length of the gap $l_S$ is dimensioned as if the permanent magnet were not present.

The use of permanent magnets thus permits greater thicknesses $b_{Ai}$ of the magnetically active layers. Furthermore, the magnetically inactive layers can also be embodied to be thicker. The result is that when producing the inventive electric machine a higher relative accuracy is achieved, and the individual layers have a higher stability per se and are easier to handle during production.

In a further advantageous configuration of the invention the magnetically inactive layers are spacers. The spacers are advantageously embodied to be electrically isolating. The spacers can comprise electrically conductive parts for mechanical reinforcement, as electrically conductive connections occurring at selected points are possible between the magnetically active layers to a certain degree, without impairing the properties of the electric machine.

The spacers can be embodied such that they do not completely occupy the space between the magnetically active layers, so that they form hollow spaces, e.g. in the form of channels, in the magnetically inactive layers. Thus a fluid, e.g. a gas or a liquid, can flow between the spacers to cool the electric machine. In this way the inventive electric machine has virtually the same performance but a smaller mass and provides ideal opportunities for cooling. The fluid can advantageously cool windings which e.g. are arranged around the first magnetic pole or around the second magnetic pole. If the stator comprises magnetic poles according to the first magnetic pole with spacers which do not completely occupy the space between the magnetically active layers, the fluid can penetrate through the hollow spaces to the rotor.

If the spacers completely occupy the space between the magnetically active layers, a high level of stability can be achieved. The spacers are magnetically inactive layers which can be arranged flush to the ends of the magnetically active layers situated at the gap.

All spacers in question can be embodied as an intermediate plate, a panel plate, a lamella or a spacing lamella. This means in particular that the surfaces of the spacers can be correspondingly structured in order to achieve a better cooling effect or a better stability of the spacers. A high stability with small mass is achieved in particular by spacers made of glass fiber reinforced plastic (GRP) or carbon fiber reinforced plastic (CRP).

In a further advantageous configuration of the invention the magnetically active layers are fixed to the magnetically inactive layers. As a result the effect of a force on the magnetically active layers is introduced into the magnetically inactive layers and from there is introduced into the further construction of the rotor or stator. The force can thus already be introduced into the magnetically inactive layer at the end of the first magnetic pole bounding the gap. A single magnetically active layer may thus have less stability, because the forces are already transmitted to the magnetically active layers at the end bounding the gap. The transmission of the force can be effected in form-fit manner, e.g. by correspondingly shaped surfaces or structured surfaces in the case of the magnetically inactive layers or the magnetically active layers. Both the magnetically active and the magnetically inactive layers can also have correspondingly structured surfaces which catch on one another. The magnetically active layer can also be fixed to the magnetically inactive layers in force-fit manner. Force-fit fixing can also be used in conjunction with the form-fit fixing described. The magnetically active layers can also be adhesively bonded to the magnetically inactive layers. It is in particular advantageous if the magnetically active layers and the magnetically inactive layers have large surfaces opposing one another. Favorable means of fixing can then be used which ensure a low degree of fixing locally, but sufficient fixing over a large area.

If the magnetically active layers are fixed to the magnetically inactive layers, the magnetically active layers can be embodied to be very thin. This enables eddy currents to be better suppressed. Thin magnetically active layers are also therefore possible, because as a result of being fixed to the magnetically inactive layers they assume the shape of the magnetically inactive layers.

Preferably glass fiber reinforced plastic (GRP) or carbon fiber reinforced plastic (CRP) can also be used here for the magnetically inactive layers. This permits an advantageous connection to a support structure, e.g. a housing or a vehicle chassis, which is also produced from these materials in a lightweight design.

In a further advantageous configuration of the invention the magnetically inactive layers are connected by a comb-like structure to a support structure and/or at least one further magnetic pole. The support structure is in particular a component of the stator or rotor. The comb-like connection to the support structure permits an extensive connection between the support structure and the magnetically inactive layers which permit a very good transmission of the forces acting on the magnetically inactive layers, without using expensive means of connection.

The comb-like connection of the first magnetic pole to a further magnetic pole enables individual magnetic poles to be produced and to be connected to one another thanks to the comb-like connection depending on the requirements of the electric machine to form a rotor or stator.

In a rotary electric machine the magnetic poles form a circuit or they emulate this in a polygon-like manner. Besides the comb-like connection of the individual magnetic poles to one another, a continuous ring can additionally hold the magnetic poles in place.

In a further advantageous configuration of the invention the electric machine comprises a stator, which has the first magnetic pole, and a rotor, which has the second magnetic pole. Thanks to the inventive embodiment of at least one of the magnetic poles of the stator in the shape of the first magnetic pole the mass of the stator is reduced. This is particularly advantageous in electric machines whose stator has the largest mass of magnetically active parts. If all magnetic poles of the stator and all remaining parts of the magnetically active part, e.g. the yoke of the stator, are embodied in respect of the layers like the first magnetic pole, this produces a very low-mass stator.

A segmented structure of the stator, in which the magnetic poles of the stator are connected in a comb-like manner to one another is also advantageous. The stator is here constructed of individual segments. An advantage of a segmented stator is that for example in a rotary electric machine the stator does not need to be embodied continuously along the circumference of the machine. The stator can have intervals, which in particular in mobile applications can be used to optimize space.

In a further advantageous configuration of the invention the electric machine comprises a rotor, which has the first magnetic pole, and a stator, which has the second magnetic pole. In this form of embodiment the rotor has a small moment of inertia, because at least one magnetic pole of the rotor is embodied like the first magnetic pole. The lowest moment of inertia within the meaning of the invention is then achieved when all magnetic poles of the rotor are embodied like the first magnetic pole and also all magnetically active parts of the rotor, e.g. the yoke of the rotor, are embodied like the first magnetic pole in respect of the layers. The form of embodiment with the rotor with a small moment of inertia is particularly interesting for applications in which a high acceleration is required.

In a further advantageous configuration of the invention the electric machine is a linear machine. In a linear machine the stator is moved in a plane relative to the rotor. In the case of the linear machine it is also possible for the rotor to be moved in a plane relative to the stator. One distinguishing feature between stator and rotor of the linear machine is frequently their different mass. In order to configure the rotor simply, in many applications the stator is moved relative to the rotor. It is advantageous here if the stator comprises the first magnetic pole, in order to reduce the moving mass with a virtually unchanged performance. In this way a higher acceleration is achieved.

In a further advantageous configuration of the invention the electric machine is a rotary electric machine. In a rotary electric machine the rotor rotates relative to the stator. The rotor has an axis of rotation, about which it rotates during operation of the rotary electric machine. The rotor is mounted in the stator with reference to the axis of rotation. Between the magnetic poles of the rotor and the magnetic poles of the stator is the gap $l_S$. The axis of rotation of the rotor is in particular configured as a shaft, so that the electric machine can emit motive energy or by rotation of the rotor by an external force can generate electric energy.

The stator and the rotor of a rotary electric machine can also be configured by segments which are suitable for a linear motor. The segments then partially or fully emulate a curved shape of the stator or rotor in polygon-like manner.

The advantageous configurations described and advantageous configurations further cited below can be combined with one another in any way.

Thus in an advantageous configuration of the invention some or all magnetic poles of the stator and of the rotor are to be embodied like the inventive first magnetic pole as a layering of magnetically active and inactive layers in accordance with the specified conditions. The result is a low-mass electric machine which has virtually the same performance as an electric machine with the compact structure of the magnetically active parts.

The invention can be embodied independently of the construction and the underlying operating principle of a rotary electric machine or linear machine. Examples of rotary electric machines and linear machines are asynchronous machines, synchronous machines and commutator machines. Furthermore, in the case of rotary electric machines it is possible to design them e.g. as an internal rotor machine or an external rotor machine. Different designs are also possible with linear machines. Thus e.g. a stator can interact with more than one rotor. Likewise the invention can be embodied with alternating current machines or direct current machines.

Furthermore, the invention, in particular its configurations, can advantageously be combined with possibilities for reducing the mass of an electric machine known from the prior art. Examples of these possibilities comprise an optimized lamination or magnetically active materials with a high saturation polarization.

The object is also achieved by a magnetic pole part for use as a first magnetic pole for an electric machine.

An inventive magnetic pole part comprises a first magnetic pole for use as a first magnetic pole for an electric machine, which has an arrangement of layers which comprises magnetically active layers with a total volume $V_a$, wherein the arrangement comprises magnetically inactive layers with a total volume $V_i$ which have a lower average density than the magnetically active layers, and a sequence in the arrangement of the magnetically inactive layers and the magnetically active layers is essentially specified by a repetition of a period p which has a defined order of magnetically active layers and magnetically inactive layers, wherein a spatial component k which is defined by the equation $$k = V_a/(V_a + V_i)$$

fulfills the condition $$0.5 \leq k \leq 0.8.$$

The effects and advantages of the magnetic pole part are described in connection with an inventive electric machine, as the magnetic pole part is suitable for use for the first magnetic pole for an electric machine.

The object is also achieved by a vehicle which comprises an inventive electric machine.

An inventive vehicle, in particular a land vehicle, a water vehicle or an aircraft, comprises an inventive electric machine, in particular in the various combinations of the configurations described. So that the vehicle has a low energy consumption for a distance traveled, an attempt is made to keep the mass of the vehicle as small as possible.

The drives of the vehicles are generally designed so that they are predominantly operated at their nominal load. The use of an inventive electric machine enables the mass of the vehicle to be reduced with the same drive performance.

The inventive electric machine can particularly advantageously be used in vehicles in which the electric machine is used with a maximum load which is approx. 20% above the nominal load. In the case of a load which exceeds the nominal load by more than 20%, the inventive electric machine can also still be used advantageously in vehicles. However, the load of the electric machine should not exceed twice the nominal load.

In the case of vehicles such as e.g. motor vehicles the main drive is very frequently subjected to varying loads. Thus e.g. in heavy traffic or in the town as a result of traffic lights changing, the vehicle is frequently accelerated and decelerated again. The most commonly used motor vehicles still have internal combustion engines. Internal combustion engines have less acceleration force compared to electric machines when the vehicle is started up. Motorists are used to the handling characteristics of vehicles with internal combustion engines. In the inventive vehicle it was recognized that a smaller maximum load in the case of the electric machine does not cause any acceptance problems on the part of motorists. Consequently the inventive electric machine can be used particularly advantageously in motor vehicles.

In rail vehicles, water vehicles or aircraft the drive of the vehicle is predominantly subject to a constant load. Therefore the mass can be greatly reduced here in the case of an inventive vehicle by using an inventive electric machine.

In a further advantageous configuration of the invention a vehicle, in particular a land vehicle, a water vehicle or an aircraft, comprises an inventive electric machine as part of a hybrid drive. Here an inventive electric machine is used as the main drive. If the handling characteristics require subjecting the electric machine to more than 20% nominal load or twice the nominal load, the additional load can be taken on by a further drive.

In a further advantageous configuration of the invention a vehicle, in particular a land vehicle, a water vehicle or an aircraft, comprises a direct drive, which comprises an inventive electric machine. The electric machine comprises a drive shaft which is connected to the rotor, and is directly coupled to an output shaft of the vehicle in order to move the vehicle, which means in particular that the output shaft and the drive shaft rotate at the same speed. In particular the rotor is attached to the drive shaft. Thanks to the inventive avoidance of a gearbox in connection with the electric machine of the invention the mass of the vehicle is in this way reduced and thus the energy consumption of the vehicle falls.

In a further advantageous configuration of the invention a vehicle, in particular a land vehicle, a water vehicle or an aircraft, comprises an inventive electric machine, in particular in the various combinations of the configurations described as an auxiliary drive, e.g. for window openers or cooling devices. Because of the many small auxiliary drives which are present in a vehicle, a large overall weight saving is possible in the case of the inventive vehicle.

The object is also achieved by a wind turbine which comprises an inventive electric machine.

An inventive wind turbine comprises an inventive electric machine, in particular in the various combinations of the configurations described. The inventive wind turbine further comprises a blade, which is mechanically coupled to the rotor of the electric machine. In a wind turbine the mast and its support structure must safely bear the mass at the top end of the mast in any wind strengths and bending loads that occur, without damage occurring to the mast. Consequently efforts are made to keep the load at the end of the mast low. However, on the other hand it is desired to attach a large generator at the end of the mast, in order to generate as much electrical energy as possible from the wind turbine. It is in fact cheaper to build a large wind turbine with high generator output, than numerous smaller wind turbines with a low generator output. In the case of the inventive wind turbine a higher generator output can be produced with the same mass at the end of the mast. The use in the rotor of magnetic poles, the structure of which corresponds to that of the first magnetic pole, has the particular advantage that because of the low-mass rotor the force of the wind has to move a smaller mass in order to set the blade in motion.

The object is further achieved by a method for producing an electric machine.

The inventive method for producing an electric machine comprises
selecting magnetically inactive layers that have a lower average density than the magnetically active layers,
the spatial component k being fixed according to the condition $$0.5 \leq k \leq 0.8$$

a sequence of a period p of magnetically active layers and magnetically inactive layers being fixed, and
the arrangement which comprises the magnetically active layers and the magnetically inactive layers essentially being fixed by a repetition of the period p.

The method inventively permits the production of electric machines which have a significant reduction in the mass of the magnetically active parts with a small reduction in performance compared to electric machines with a compact structure of the magnetically active parts.

By selecting a first material for the magnetically active layers and a second material for the magnetically inactive layers, which has a lower average density than the first material, a reduction in mass is achieved. According to the invention the reduction in mass is enabled by the magnetically inactive layers made from the second material having a significant proportion of the volume of the magnetically active parts of the electric machine. Because the magnetically inactive layers or magnetically active layers can also be structured non-homogeneously, the average densities of the volumes $V_a$ and $V_i$ are taken into account.

In a further advantageous configuration of the method for producing an electric machine the thicknesses $b_{Ai}$ of the magnetically active layers (3) are fixed, so that the condition $$b_{Ai} \leq l_S/4 \ldots l_S/20$$

is fulfilled.

If the thicknesses $b_{Ai}$ of the magnetically active layers are fixed such that they fulfill the relevant condition, a significant reduction is achieved in the mass of the electric machine compared to a compact structure of the magnetically active parts of the electric machine with only a small reduction in performance; in particular by suitably selecting a particular part-value of the length $l_S$, e.g. a fraction from ¼ to 1/20 of the length $l_S$, in the condition for the thicknesses $b_{Ai}$ the reduction in mass or the resulting reduction in performance for a machine type of the electric machine or of the application can be improved.

BRIEF DESCRIPTION OF THE DRAWING

The invention is further described and explained below on the basis of the exemplary embodiments illustrated in the figures, in which.

DETAILED DESCRIPTION OF PREFERRED EMBODIMENTS

Figure 1:
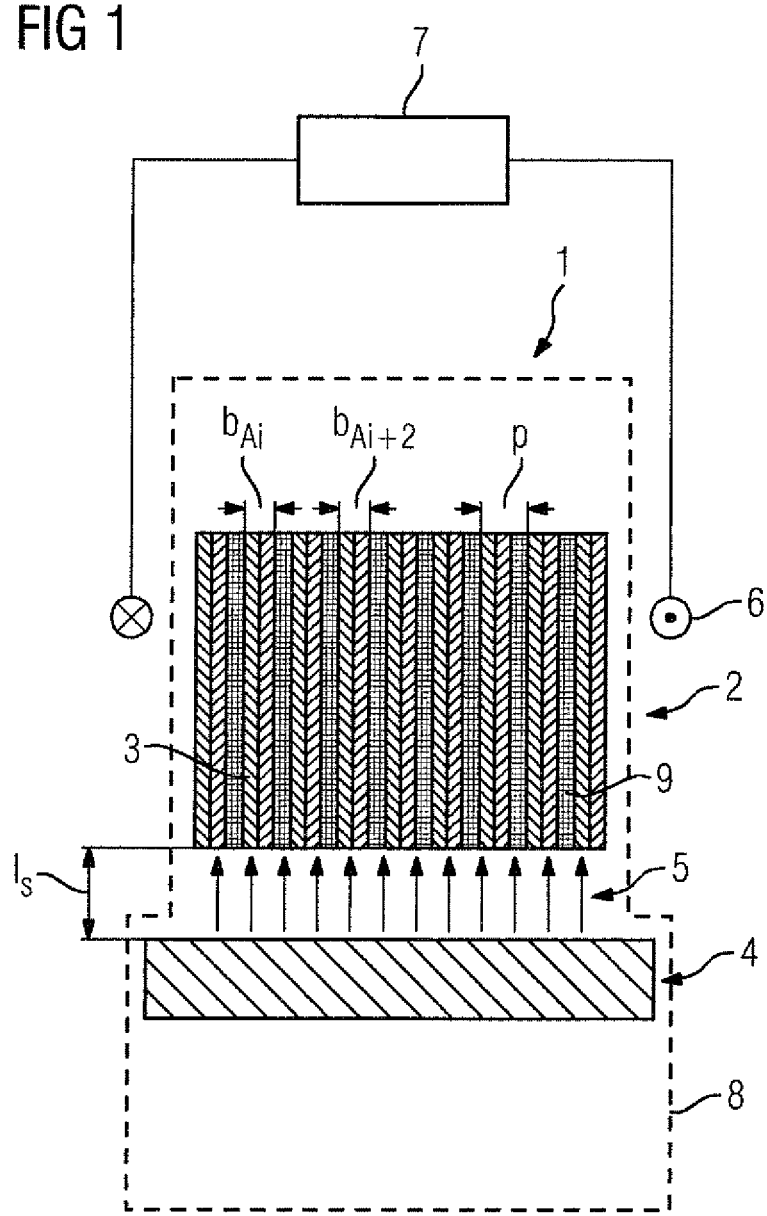
FIG. 1 shows an embodiment of an electric machine which comprises a first magnetic pole.

FIG. 1 shows an embodiment of an electric machine 1 which comprises a first magnetic pole 2. The first magnetic pole 2 comprises an arrangement of layers. The layers comprise magnetically active layers 3 and magnetically inactive layers 9, wherein the magnetically inactive layers 9 have a lower average density than the magnetically active layers 3. The arrangement of the layers has a period p. The period p has a defined order of magnetically active layers 3 and magnetically inactive layers 9. In FIG. 1 the period p starts with two consecutive magnetically active layers 3 and ends with a magnetically inactive layer 9. The arrangement of the layers is essentially a repetition of the period p. The spatial component k, which can be determined from the total volume $V_A$ of the magnetically active layers 3 and the total volume $V_i$ of the magnetically inactive layers 9, should be two-thirds in FIG. 1. The magnetic pole 2 lies opposite a second magnetic pole 4, so that a gap 5 is formed. The gap 5 has a length $l_S$ which is measured in a direction parallel to one of the layers from an end of the first magnetic pole 2 bounding the gap 5 to an end of the second magnetic pole 4 bounding the gap 5. FIG. 1 shows that the magnetically inactive layers 9 are arranged flush to the ends of the magnetically active layers 3 situated at the gap 5 and the length $l_S$ is defined for the whole arrangement of the layers. The electric machine according to FIG. 1 further comprises an electrical conductor 6 as a coupling element between an electrical circuit 7 and a magnetic circuit 8. The electrical conductor 6 preferably comprises turns which surround the first magnetic pole 2. FIG. 1 shows the electric machine 1 at an operating time at which the magnetic circuit 8 comprises the first magnetic pole 2, the gap 5 with length $l_S$ and the second magnetic pole 4, through all of which a common useful magnetic flux flows for electromechanical energy conversion. If the electric machine is a motor, the useful magnetic flux is generated during operation of the motor by a current which flows in the electrical circuit 7. The useful magnetic flux causes the first magnetic pole and the second magnetic pole to move relative to one another. The result is an electromechanical energy conversion of electrical energy which is present in the electrical circuit 7 into mechanical energy which is present because of the relative motion of the first magnetic pole 2 and the second magnetic pole 4.

If the electric machine 1 is used as a generator, the common useful magnetic flux is produced by a motion of the first magnetic pole 2 relative to the second magnetic pole 4. The useful magnetic flux then causes an electric current to flow in the electrical circuit 7. Thus in this case motive energy which moves the first magnetic pole 2 relative to the second magnetic pole 4 is converted into electrical energy in the electrical circuit 7.

In the embodiment according to FIG. 1 it is shown (not true to scale) that the thicknesses $b_{Ai}$ of the magnetically active layers 3 fulfill the condition $b_{Ai} \leq l_S/4 \ldots l_S/20$. Fulfilling the condition means e.g. that both $b_{Ai}$ and $b_{Ai}+2$ fulfill the condition.

Figure 2:
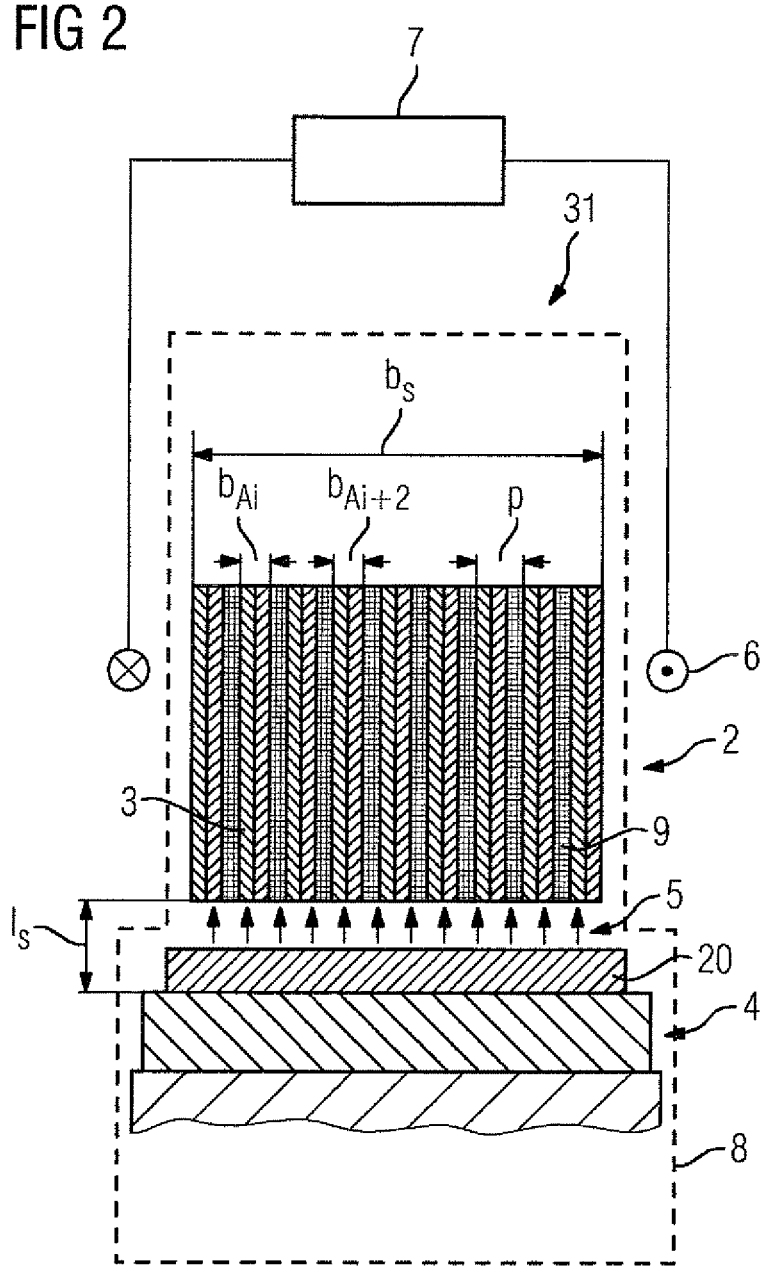
FIG. 2 shows a cross-section along the line II-II in FIG. 3.
Figure 3:
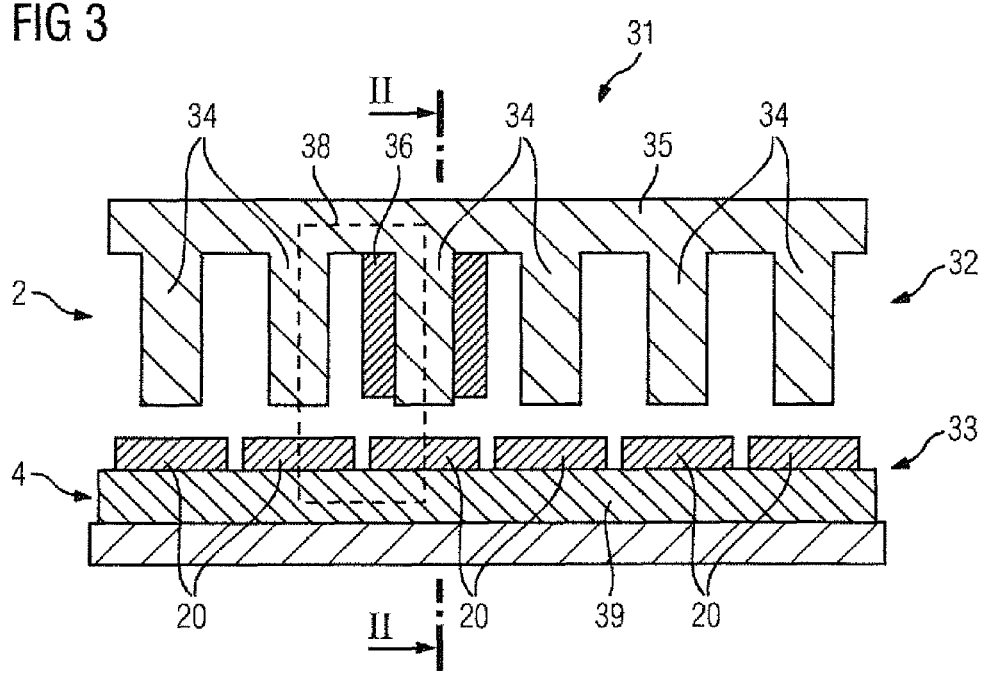
FIG. 3 shows an embodiment of the electric machine as a linear machine.

One embodiment of the electric machine 1, 51, 101 is a linear machine 31 according to FIGS. 2 and 3. FIG. 3 shows that the linear machine 31 comprises a stator 32 and a rotor 33. The stator 32 comprises several magnetic poles, whose structure corresponds to that of the first magnetic pole 2. The magnetically active layers 3 are formed according to FIG. 3 by metal sheets which in one piece form a stator yoke 35 and several teeth 34. Tooth-wound coils 36 are attached to the teeth 34, which form magnetic poles of the type of the first magnetic pole 2. A tooth-wound coil 36 is drawn in FIG. 3 by way of example. To achieve a certain distribution of the magnetic flux, some of the teeth 34 may have no tooth-wound coils 36. The electrical conductor 6 in the embodiment according to FIGS. 2 and 3 corresponds to the turns of the tooth-wound coil 36.

The rotor 33 of the linear machine 31 according to FIGS. 2 and 3 comprises several magnetic poles of the type of the second magnetic pole 4 which are connected to one another by a rotor yoke 33 and comprise permanent magnets 20. One of the permanent-magnet poles (north or south) of the permanent magnets 20 adjoins the top end of the rotor yoke 39. The gap $l_S$ is measured from said top end of the rotor yoke 39 to the free end of the teeth 34. The length $l_S$ which is measured for different teeth 34 is essentially the same. This means that deviations in the differently measured $l_S$ have no significant impact on the performance characteristics of the linear machine 31.

Figure 4:
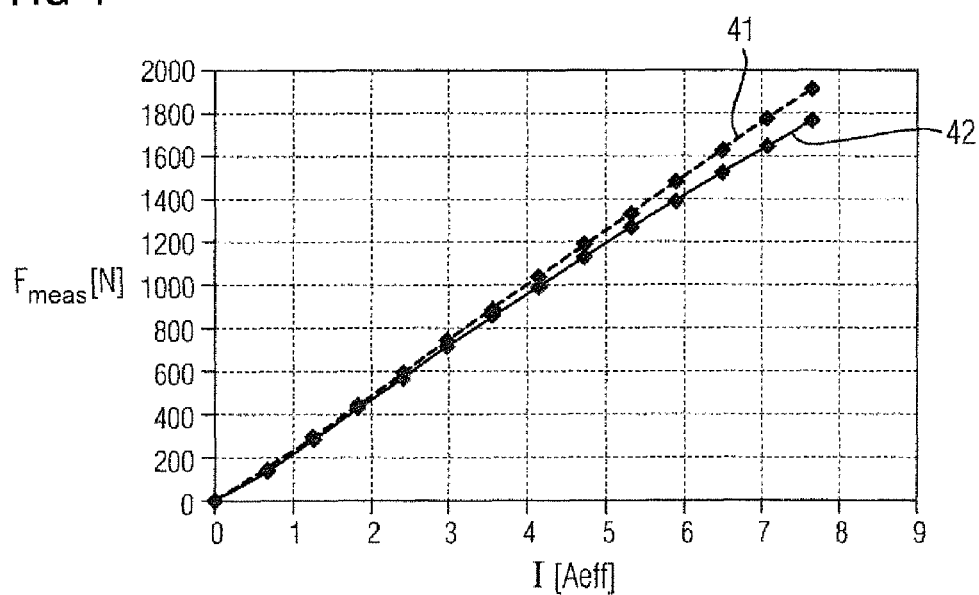
FIG. 4 shows a comparison of an inventive linear machine with a linear machine from the prior art in respect of the measured motor output at a measured current.

FIG. 4 shows the measured motor output as a function of the supply current for an inventive embodiment of the linear machine 31 as a solid line 42 with measuring points and for a linear machine, as is known from the prior art, as a dotted line 41 with measuring points.

The inventive embodiment used of the linear machine 31 is structured as a laboratory prototype from standard components of a three-phase linear motor in simplified fashion. Thus the magnetically inactive layers 9 are only metal spacers. The metal spacers are produced by bending the metal sheets of the stator 32 at some ends, so that the magnetically inactive layers 9 are formed as hollow spaces. In the linear machine 31—as shown in FIG. 2—two metal sheets of thickness 0.5 mm are mounted one after the other for a period p and subsequently the hollow space of thickness 0.5 mm is formed. The length $l_S$ is 6 mm, wherein according to one configuration of the invention permanent magnets 20 are arranged inside the gap. The permanent magnets 20 had a height of 4 mm.

The linear machine, as known from the prior art, is structured in the same way as the linear machine 31, wherein the metal sheets are not bent and thus a metal sheet is used instead of the magnetically inactive layer 9. The stator of the linear machine according to the prior art thus has a standard tight packing aimed at in the prior art.

The tooth-wound coils 36 of both the linear machines were wired up as in a three-phase linear machine from the prior art.

For the measurement according to FIG. 4 both the motors were each supplied with a supply current I measured in $A_{eff}$ and using a load cell the motor output $F_{meas}$ was measured in Newtons.

As the supply current increases the inventive embodiment of the linear machine 31 has a smaller motor output than that of the comparable linear machines from the prior art. However, in this case the loss of motor output compared to a linear machine from the prior art is small.

Figure 11:
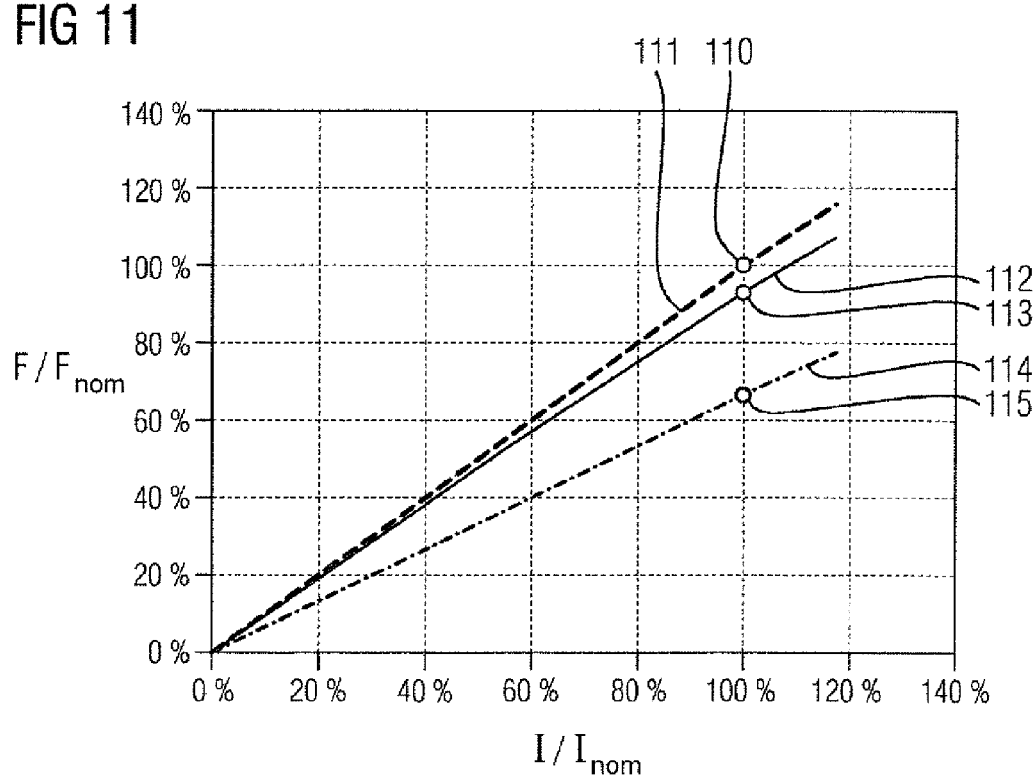
FIG. 11 shows a comparison in particular of the nominal forces at a nominal current for an inventive embodiment of the electric machine compared to electric machines from the prior art.

FIG. 11 makes clear that the loss of motor output is small. FIG. 11 shows the motor output in relation to the nominal motor output of the linear machine from the prior art. The nominal motor output corresponds to the nominal load of the linear machine and can generally be converted into a nominal output by multiplying by a nominal speed. The nominal current is the supply current which flows when the linear machine forms its nominal motor output.

The dotted line 111 and the nominal point 110 on the dotted line relate to the linear machine from the prior art. The dot-and-dash line 114 with the nominal point 115 relates to a linear machine which is constructed the same as the linear machine from the prior art, wherein an active track width $b_S$ (see FIG. 2) is reduced to approx. 67% compared to that of the linear machine which is indicated by the dotted line 111. This linear machine has a 67% smaller mass. Thus the requirement for a smaller mass can be satisfied, but the nominal force is reduced to 67% of the original linear machine from the prior art.

In the inventive embodiment of the linear machine 31 as a laboratory prototype the nominal motor output is reduced by less than 10% compared to the linear machine from the prior art. In the inventive embodiment of the linear machine 31 as a laboratory prototype a 33% reduction in the mass is thus achieved, without the nominal motor output being significantly reduced.

Figure 5:
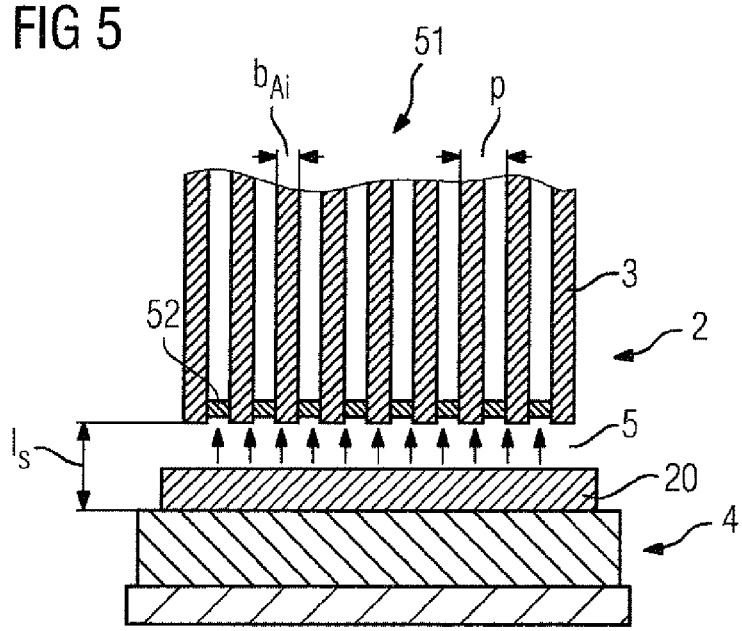
FIG. 5 shows an embodiment of the electric machine with spacers which partially occupy the space between magnetically active layers.

FIG. 5 shows an alternative embodiment of the magnetically inactive layer 9 of an electric machine 51, in which the magnetically inactive layers 9 are spacers 52. It is advantageous here to arrange the spacers 52 close to an end of the first magnetic pole 2 bounding the gap 5, to reduce the likelihood of the ends of the first magnetic pole 2 bending. To achieve a defined position of the spacers 52, these can be arranged flush to the ends of the magnetically active layers 3 situated at the gap 5. So that the first magnetic pole 2 is a stable structure, the spacers 52 can be fixed to the magnetically active layers 3.

In order to protect the magnetically active layers 3 even better against bending, further spacers 52 can be attached in all directions of the layer, preferably evenly spaced.

The extent of the spacers 52 perpendicular to the drawing plane of FIG. 5, in other words in a direction or one of the directions which runs parallel to the magnetically active layers 3 and does not point in the direction of the gap, can be explained more briefly than the magnetically active layers 3. This enables a fluid, such as e.g. air or water, for cooling to move in a direction parallel to one of the layers to reach the second magnetic pole 4. Thus not only the first magnetic pole 2 can be cooled, but also the second magnetic pole 4. The spacers 52 can be embodied at selective points or with a very small contact surface with the magnetically active layers 3, so that a fluid for cooling can flow in all directions parallel to the layers.

Figure 6:
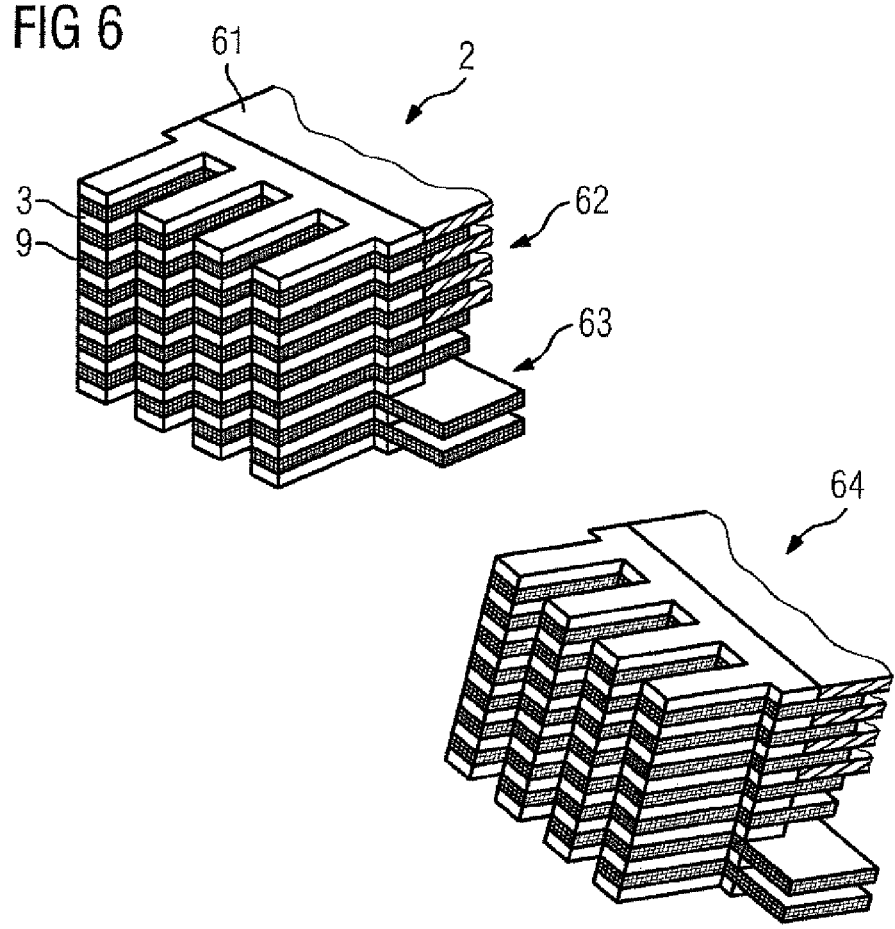
FIG. 6 shows an embodiment of a first magnetic pole and of a further magnetic pole.

FIG. 6 shows an embodiment of a first magnetic pole 2 and of a further magnetic pole 64. The magnetically active layers 3 are fixed to the magnetically inactive layers 9. The fixing can be effected by an adhesive between the surfaces of the magnetically active layers 3 and those of the magnetically inactive layers 9. Because of the large surfaces the magnetically active layers 3 can be fixed robustly and evenly to the magnetically inactive layers 9. The magnetically inactive layers 9 introduce a large proportion of the force which acts on the magnetically active layers 3 into a support structure 61. To ensure the magnetically inactive layers 9 are fixed to the support structure 61 and that the forces on the magnetically inactive layers 9 are introduced into the support structure 61, a comb-like structure 62 is used.

A connection between the first magnetic pole 2 and the further magnetic pole 64 is realized by a comb-like structure 63.

The comb-like structures 62, 63 can enable the connection between the first magnetic pole 2 and the further magnetic pole 64 or between the magnetically inactive layers 9 and the support structure 61 in form-fit manner alone. Depending on the requirement, the connection can be supported by the comb-like structure 62 or 63 by force-fit means. This can in particular be an adhesive or a surface structure with a certain roughness.

Figure 7:
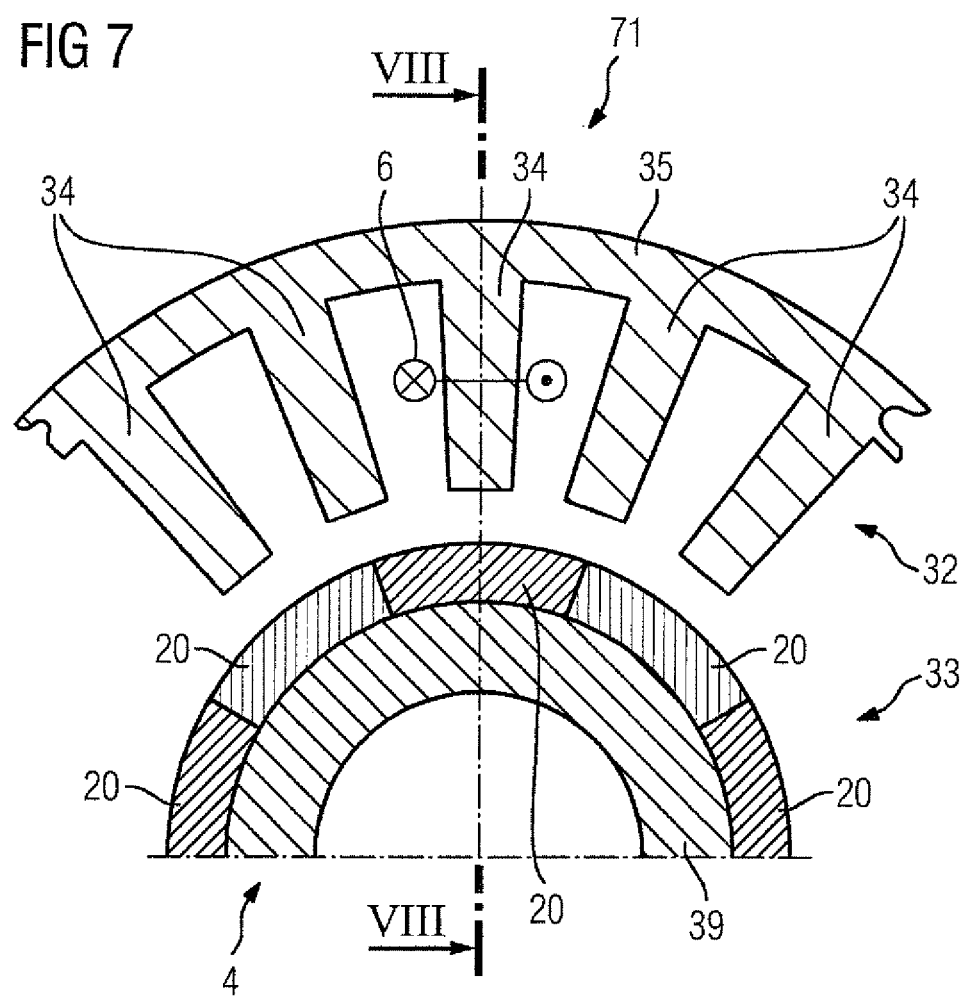
FIG. 7 shows an embodiment of an electric machine as a rotary electric machine.

FIG. 7 shows a rotary electric machine 71 which comprises a stator 32 and a rotor 33. The stator yoke 35, the teeth 34, the rotor yoke 39 and the arrangement of the permanent magnets 20 or the permanent magnets 20 themselves are adapted in form and function to a design of an electric rotary machine 71.

Figure 8:
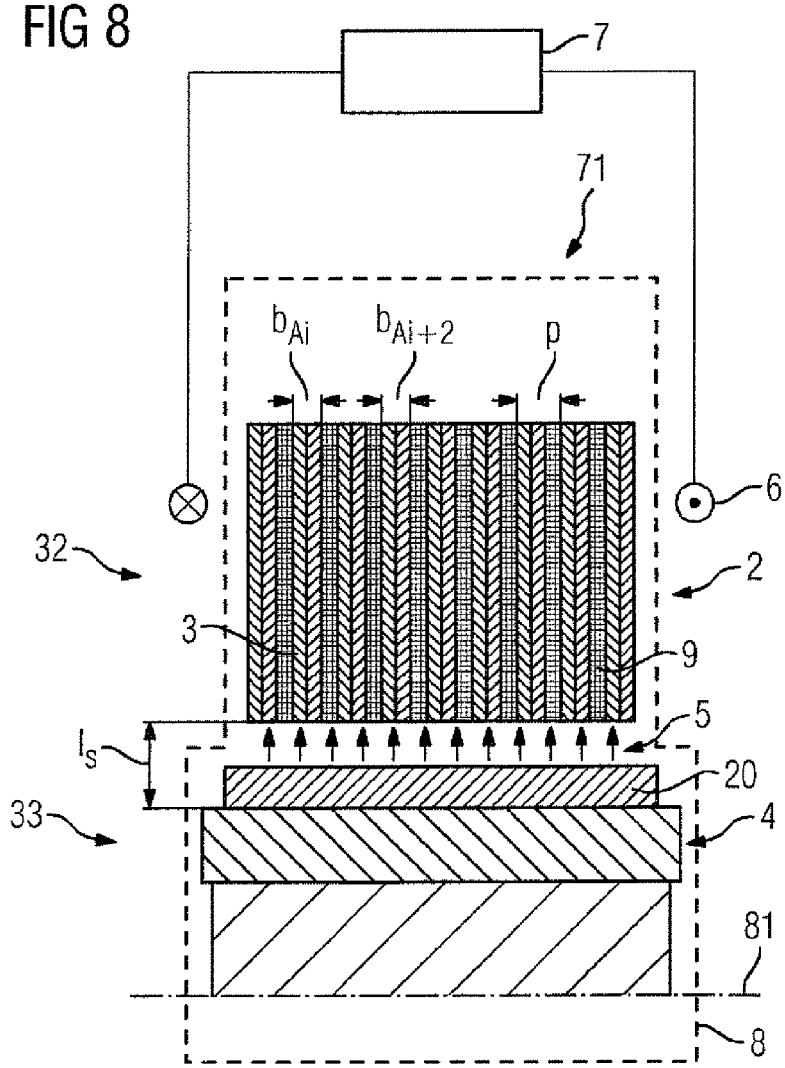
FIG. 8 shows a cross-section along the line VII-VII of the rotary electric machine in FIG. 7.

FIG. 8 shows a cross-section of the rotary electric machine 71 along the line VIII-VIII. The rotor 33 is mounted in the rotary electric machine 71 so as to rotate about the axis of rotation 81. In particular a shaft extends along the axis of rotation 81 and is supported using bearings on a housing of the rotary electric machine 71.

If the rotary electric machine 71 is operated as a generator, a torque is transmitted via the shaft to the rotor 33. The rotor 33 generates a useful flux thanks to the permanent magnets 20 in the magnetic poles of the stator 32 which have a structure like the first magnetic pole 2. Individual or multiple magnetic poles of the rotor 32 are surrounded by an electrical conductor 6, in particular as turns e.g. in the form of a tooth-wound coil. Because of the rotation of the rotor 33 about the axis of rotation 81 the useful flux undergoes a change in one or more of the magnetic poles of the stator 32. This change generates a current in the electrical conductor 6, so that electrical energy is present in the electrical circuit 7.

When the rotary electric machine 71 is operated as a motor a variable useful flux is generated by a current in the electrical conductor 6 in the magnetic poles of the stator 32 which are structured like the first magnetic pole 2. The variable useful flux causes the rotor 33 to rotate about the axis of rotation 81 and to emit a torque onto the shaft which is fixedly connected to the rotor 33. Thus electrical energy is converted into mechanical energy.

Figure 9:
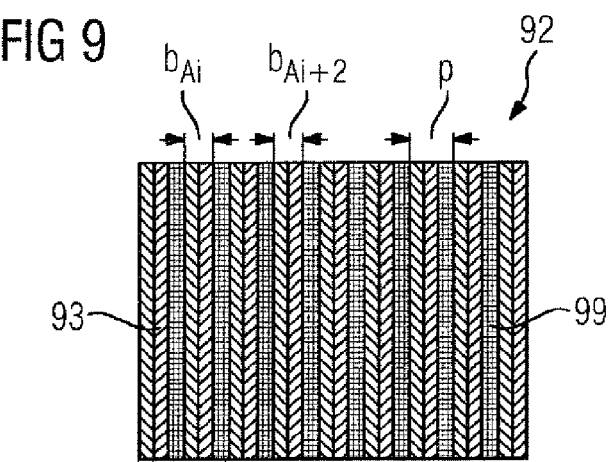
FIG. 9 shows an embodiment of a magnetic pole part.

FIG. 9 shows an embodiment of a magnetic pole part 92 for use as a first magnetic pole 2 for an electric machine 1, 51, 101. The magnetic pole part 92 comprises an arrangement of layers. The layers comprise magnetically active layers 93 and magnetically inactive layers 99, wherein the magnetically inactive layers 99 have a lower average density than the magnetically active layers 93. The arrangement of the layers has a period p. The period p has a defined order of magnetically active layers 93 and magnetically inactive layers 99. In FIG. 1 the period p starts with two consecutive magnetically active layers 93 and ends with a magnetically inactive layer 99. The arrangement of the layers is essentially a repetition of the period p. The spatial component k, which can be determined from the total volume $V_A$ of the magnetically active layers 3 and the total volume $V_i$ of the magnetically inactive layers 9, should be two-thirds in FIG. 11. The magnetic pole part 92 is for example suitable for use as a first magnetic pole 2 in the linear machine 31 and the rotary electric machine 71.

Figure 10:
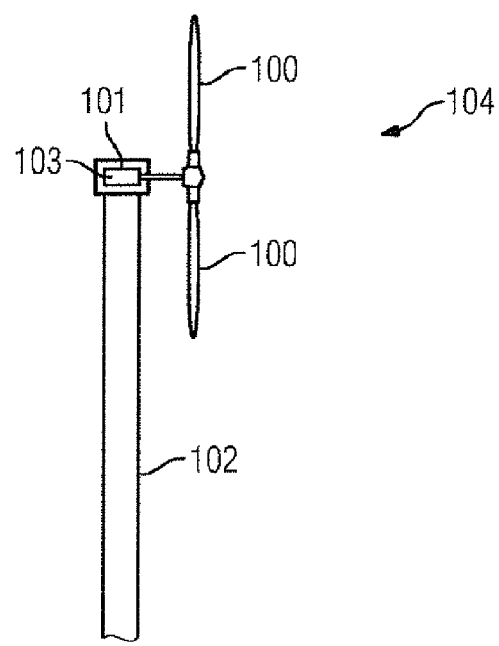
FIG. 10 shows an embodiment of a wind turbine.

FIG. 10 shows a wind turbine 104 which comprises a mast 102 which supports an electric machine 101. The electric machine 101 is a rotary electric machine, whose rotor 103 is mechanically coupled to a blade 100. If a wind moves the blade 100, a rotary motion is transmitted to the rotor 33, 103 thanks to the mechanical coupling. Thanks to the motion of the rotor 33, 103 the electric machine 1, 51, 101 generates electrical energy. The wind turbine 104 can be equipped according to the prior art. This means that several blades 100 are coupled to the rotor 33, 103, in order to make maximum use of the force of the wind. Furthermore, the electric machine 1, 51, 101 can also be accommodated in a gondola (standard in wind turbines) at the end of the mast 102. The stator 32 of the electric machine 1, 51, 101, which is supported by the wind turbine 104, is inventively embodied. Thus the stator 32 has a reduced mass compared to the prior art. Thus the mechanical construction of the wind turbine 104 must be designed for smaller static and dynamic forces. This has the advantage that the wind turbine 104 can be manufactured more cheaply and/or with a higher assurance of stability. If magnetic poles of the rotor 33, 103 are inventively embodied like the first magnetic pole, the rotor 33, 103 has a smaller moment of inertia, so that it can already be set rotating even at lower wind speeds. Thus with the inventive embodiment of the wind turbine the wind energy can be converted into electrical energy more efficiently.

An inventive embodiment of a vehicle is a land vehicle, a water vehicle or an aircraft which comprises inventive electric machines 1, 51, 101. The auxiliary drives in the vehicle, e.g. for window opener or cooling device, are fitted with inventive electric machines 1, 51, 101. Furthermore, the vehicle is driven by an inventive electric machine 1, 51, 101, in order to set the vehicle in motion and to correctly maintain this motion.

In one embodiment of the vehicle the inventive electric machine 1, 51, 101 is the main drive of the vehicle, which essentially performs the work alone, in order to set the vehicle in motion and to correctly maintain the motion.

In a further embodiment of an inventive vehicle the vehicle is a water vehicle, land vehicle or aircraft which has an inventive electric machine as part of a hybrid drive.

What is claimed is:

1. An electric machine comprising:
a first magnetic pole comprising an arrangement of layers having magnetically active layers with a total volume ($V_a$) and magnetically inactive layers with a total volume ($V_i$) which have a lower average density than the magnetically active layers, wherein the magnetically active layers and the magnetically inactive layers repeat in a specified order with a period p, and wherein a ratio (k) of the total volume ($V_a$) of the magnetically active layers to the combined total volume ($V_a+V_i$) of the magnetically active layers and the magnetically inactive layers fulfills the condition $0.5 \leq k \leq 0.8$,
a second magnetic pole confronting the first magnetic pole and movable relative to the first magnetic pole, and
a gap having a length ($l_S$) extending between an end of the first magnetic pole and an end of the confronting second magnetic pole in a direction parallel to a magnetically active or magnetically inactive layer, and
an electrical conductor constructed as a coupling element between an electrical circuit and a magnetic circuit,
wherein at an operating time, the magnetic circuit comprises the first magnetic pole, the gap and the second magnetic pole, and is permeated by a common useful magnetic flux for electromechanical energy conversion.

2. The electric machine of claim 1, wherein the magnetically active layers have thicknesses ($b_{Ai}$), wherein $$b_{Ai} \leq S,$$

wherein S is in a range between $l_S/20$ and $l_S/4$, with $l_S$ being the length of the gap.

3. The electric machine of claim 1, wherein a permanent magnet comprising a first and a second permanent-magnet pole is arranged in the gap in abutting relationship with the second magnetic pole, with a first permanent-magnet pole facing the second magnetic pole.

4. The electric machine of claim 1, wherein the magnetically inactive layers are spacers.

5. The electric machine of claim 1, wherein the magnetically active layers are affixed to the magnetically inactive layers.

6. The electric machine of claim 1, further comprising a comb-shaped structure connecting the magnetically inactive layers to at least one of a support structure and an additional magnetic pole.

7. The electric machine of claim 1, wherein the magnetically inactive layers do not completely occupy a space between the magnetically active layers.

8. The electric machine of claim 1, wherein the magnetically inactive layers are arranged flush with the magnetically active layers at the end of the first magnetic pole.

9. The electric machine of claim 1, wherein the first magnetic pole forms a stator of the electric machine and the second magnetic pole forms a rotor of the electric machine.

10. The electric machine of claim 1, wherein the first magnetic pole forms a rotor of the electric machine and the second magnetic pole forms a stator of the electric machine.

11. The electric machine of claim 1, wherein the electric machine is a linear electric machine.

12. The electric machine of claim 1, wherein the electric machine is a rotary electric machine.

13. A magnetic pole part constructed as a first magnetic pole of an electric machine, comprising:
an arrangement of layers having magnetically active layers with a total volume ($V_a$) and magnetically inactive layers with a total volume ($V_i$) which have a lower average density than the magnetically active layers, wherein the magnetically active layers and the magnetically inactive layers repeat in a specified order with a period p, and wherein a ratio (k) of the total volume ($V_a$) of the magnetically active layers to the combined total volume ($V_a+V_i$) of the magnetically active layers and the magnetically inactive layers fulfills the condition $0.5 \leq k \leq 0.8$.

14. A vehicle including an electric machine which comprises
a first magnetic pole comprising an arrangement of layers having magnetically active layers with a total volume ($V_a$) and magnetically inactive layers with a total volume ($V_i$) which have a lower average density than the magnetically active layers, wherein the magnetically active layers and the magnetically inactive layers repeat in a specified order with a period p, and wherein a ratio (k) of the total volume ($V_a$) of the magnetically active layers to the combined total volume ($V_a+V_i$) of the magnetically active layers and the magnetically inactive layers fulfills the condition 0.5≤k≤0.8, a second magnetic pole confronting the first magnetic pole and movable relative to the first magnetic pole, and a gap having a length ($l_S$) extending between an end of the first magnetic pole and an end of the confronting second magnetic pole in a direction parallel to a magnetically active or magnetically inactive layer, and an electrical conductor constructed as a coupling element between an electrical circuit and a magnetic circuit, wherein at an operating time, the magnetic circuit comprises the first magnetic pole, the gap and the second magnetic pole, and is permeated by a common useful magnetic flux for electromechanical energy conversion.

15. A wind turbine including an electric machine which comprises a first magnetic pole comprising an arrangement of layers having magnetically active layers with a total volume ($V_a$) and magnetically inactive layers with a total volume ($V_i$) which have a lower average density than the magnetically active layers, wherein the magnetically active layers and the magnetically inactive layers repeat in a specified order with a period p, and wherein a ratio (k) of the total volume ($V_a$) of the magnetically active layers to the combined total volume ($V_a+V_i$) of the magnetically active layers and the magnetically inactive layers fulfills the condition 0.5≤k≤0.8, a second magnetic pole confronting the first magnetic pole and movable relative to the first magnetic pole, and a gap having a length ($l_S$) extending between an end of the first magnetic pole and an end of the confronting second magnetic pole in a direction parallel to a magnetically active or magnetically inactive layer, and an electrical conductor constructed as a coupling element between an electrical circuit and a magnetic circuit, wherein at an operating time, the magnetic circuit comprises the first magnetic pole, the gap and the second magnetic pole, and is permeated by a common useful magnetic flux for electromechanical energy conversion, the wind turbine further comprising a blade that is mechanically coupled to a rotor of the electric machine.

16. A method for producing an electric machine, comprising:

forming a first magnetic pole comprising an arrangement of layers having magnetically active layers with a total volume ($V_a$) and magnetically inactive layers with a total volume ($V_i$) which have a lower average density than the magnetically active layers, wherein the magnetically active layers and the magnetically inactive layers repeat in a specified order with a period p, and wherein a ratio (k) of the total volume ($V_a$) of the magnetically active layers to the combined total volume ($V_a+V_i$) of the magnetically active layers and the magnetically inactive layers fulfills the condition 0.5≤k≤0.8, forming a second magnetic pole confronting the first magnetic pole and movable relative to the first magnetic pole, wherein gap having a length extends between an end of the first magnetic pole and an end of the confronting second magnetic pole in a direction parallel to a magnetically active or magnetically inactive layer, and arranging an electrical conductor constructed as a coupling element between an electrical circuit and a magnetic circuit.

17. The method of claim 16, wherein the magnetically active layers have thicknesses ($b_{Al}$) defined by:

$$l_S/4 \le b_{Al} \le l_S/20,$$

wherein $l_s$ is the length of the gap.

* * * * *